(12) United States Patent
Eggert et al.

(10) Patent No.: US 6,899,655 B2
(45) Date of Patent: May 31, 2005

(54) METHOD OF AND APPARATUS FOR PREVENTING SHIFTS OF REFERENCE POSITIONS OF FRICTION CLUTCHES

(75) Inventors: Thomas Eggert, Karlsruhe (DE); Jens Martin, Ottersweier (DE)

(73) Assignee: Luk Lamellen und Kupplungsbau Beteiligungs KG, Buhl (DE)

(*) Notice: Subject to any disclaimer, the term of this patent is extended or adjusted under 35 U.S.C. 154(b) by 0 days.

(21) Appl. No.: 10/665,380

(22) Filed: Sep. 18, 2003

(65) Prior Publication Data
US 2004/0102287 A1 May 27, 2004

(30) Foreign Application Priority Data
Sep. 19, 2002 (DE) .......................... 102 43 501

(51) Int. Cl.[7] .............................. F16D 48/12
(52) U.S. Cl. ............................. 477/174
(58) Field of Search ............... 192/30 W, 84.6, 192/85 C, 85 R, 91 R, 103 F, 109 F; 477/166, 174

(56) References Cited

U.S. PATENT DOCUMENTS 5,409,091 A   4/1995  Reik et al.
5,632,706 A   5/1997  Kremmling et al.
6,151,544 A * 11/2000  Amisano et al. ............. 477/174
6,309,325 B1 * 10/2001  Baer et al. .................. 477/174
6,711,486 B1 * 3/2004  Karlsson et al. ............. 701/67

FOREIGN PATENT DOCUMENTS

EP  0 635 391 A2   1/1995
EP  1 262 360 A1  12/2002
GB  2 310 473 A1   8/1997
GB  2 317 933 A1   4/1998
GB  2 319 817 A1   6/1998

* cited by examiner

Primary Examiner—Sherry Estremsky
(74) Attorney, Agent, or Firm—Darby & Darby

(57) ABSTRACT

A method of and an arrangement for preventing a shift of the reference position of a clutch which is operated by an actuator and is installed in the power train of a motor vehicle. Such shift of reference position can be caused in response to axial displacements between the input and output shafts of the clutch. The method includes the steps of routinely ascertaining the reference position, memorizing and thus actualizing the information pertaining to the ascertained reference position, ascertaining an operational parameter which is the cause of axial displacements between the input and output shafts of the clutch, and altering the routine determination and the memorizing of the reference position when the operational parameter exceeds a predetermined threshold value.

18 Claims, 2 Drawing Sheets

METHOD OF AND APPARATUS FOR PREVENTING SHIFTS OF REFERENCE POSITIONS OF FRICTION CLUTCHES

BACKGROUND OF THE INVENTION

The present invention relates to a method of and to an arrangement or apparatus for reducing the likelihood of malfunctioning, or of less than optimal functioning, of clutches in the power trains of motor vehicles. More particularly, the invention relates to improvements in methods of and in arrangements for preventing or reducing the likelihood of malfunctioning, such as shifts of reference positions, of actuator-operated friction clutches which are engageable and disengageable to transmit, or to interrupt the transmission of, torque between the prime movers (such as internal combustion engines) and the change-speed transmissions in the power trains of motor vehicles.

The reference position of a clutch in the power train of a motor vehicle is likely or bound to change as a result of axial shifting of at least one of the input and output shafts of the clutch relative to the other shaft. Such changes or shifts of reference position can cause extensive discomfort to the occupant(s) of the motor vehicle (for example, during starting of the vehicle and/or during shifting of the transmission into a different gear) and/or extensive damage to the clutch and/or to other constituents of the power train. Heretofore known attempts to overcome the above outlined problems have met with no success or with limited success.

On the other hand, motor vehicles embodying automated (actuator operated) clutches have gained widespread acceptance in the industry. Such vehicles are preferred by many motorists, not only due to their increased comfort but also because the utilization of automated clutches entails substantial savings in fuel.

OBJECTS OF THE INVENTION

An object of the present invention is to provide a novel and improved power train for use in motor vehicles.

Another object of the invention is to provide a power train which affords pronounced comfort to the occupant(s) of the vehicle and can be operated satisfactorily for long periods of time with substantial savings in fuel.

A further object of this invention is to provide a novel and improved operative connection between the control unit and the clutch in a power train which employs an actuator-operated friction clutch.

An additional object of the invention is to reduce the likelihood of damage to the power train of a motor vehicle as a result of undesirable changes of reference positions of an actuator-operated friction clutch due to axial shifts between the input and output shafts of the clutch.

Still another object of the instant invention is to provide a novel and improved method of compensating for axial shifting of at least one of the input and output shafts of an automatic clutch relative to the other shaft.

A further object of our invention is to provide a novel and improved control unit for the arrangement which controls the actuator for the clutch in the power train of a motor vehicle.

Another object of the invention is to provide a novel and improved fluid-operated connection between the control circuit and the actuator for the friction clutch in the power train of a motor vehicle.

An additional object of the invention is to provide a novel array of sensors for the transmission of signals to the control unit which operates the actuator for the automatic clutch in the power train of a motor vehicle.

SUMMARY OF THE INVENTION

One feature of the present invention resides in the provision of a method of ascertaining and regulating shifts of reference position of an actuator-operated clutch in the power train of a motor vehicle wherein the shifts are caused by axial displacements of at least one of the input and output shafts of the clutch relative to the other shaft. The improved method comprises a first step of routinely ascertaining the reference position of the clutch, a second step of routinely memorizing and thus actualizing information pertaining to the ascertained reference position, a third step of determining operational parameters which initiate shifts of reference position of the clutch, and a fourth step of conforming the first and second steps to the shifted reference position when the determined operational parameter exceeds a predetermined threshold value.

The method can further comprise the steps of continuing to memorize and actualize, in the course of and subsequent to the fourth step, that information which is obtained in the second step, ascertaining and memorizan emergency reference position while the determined operational parameter is in the process of exceeding the predetermined threshold value, and regulating the actuator for the clutch as a function of the emergency reference position.

If the method is resorted to in order to ascertain and regulate shifts of reference position of an actuator-operated clutch in the power train of a motor vehicle in which the output shaft of the clutch is the torque-transmitting input shaft of a change-speed transmission, the third step can include determining the torque which is being transmitted by the output shaft of the clutch.

The method can further comprise the step of establishing a hydraulic force transmitting path between the actuator and the clutch. The first step of such method can include a snifting operation and the first and second steps can be carried out at regular intervals as long as the operational parameter is below the predetermined threshold value. Such method can comprise the additional step of carrying out at least one emergency snifting operation to thus ascertain an emergency engagement condition of the clutch when the operational parameter exceeds the predetermined threshold value. The third step of the just discussed modified method can include determining the torque which is being transmitted by the output shaft of the clutch, and such method can include the additional steps of (a) ascertaining and memorizing an emergency reference position while the determined operational parameter is in the process of exceeding the predetermined threshold value and (b) setting the engagement stage of the clutch to coincide with the emergency reference position when the torque decreases below the predetermined threshold value. Such method can further comprise the additional steps of memorizing at least one torque being transmitted by the output shaft of the clutch while the determined operational parameter is below the predetermined threshold value and reactivating the memorized at least one torque upon renewed drop of the torque below the predetermined threshold value.

Another feature of the present invention resides in the provision of an arrangement for regulating the shift of a reference position of an actuator-operated torque-transmitting clutch in the power train of a motor vehicle wherein the shift is caused by axial movements of at least one of an input shaft of the clutch and an output shaft of the clutch relative to the other shaft. The improved arrangement comprises a connection between a mobile multiple-position force-transmitting operating member (such as a piston in a master cylinder of the actuator) and a displaceable clutch setting member (e.g., a pivotable lever which can change the condition of a diaphragm spring in the clutch); a control unit for the actuator; a plurality of signal-transmitting monitoring devices which are operatively connected with the control unit and include a sensor arranged to transmit to the control unit signals denoting the positions of the operating member; means for ascertaining the force being transmitted by the operating member to displace the setting member; and means for monitoring the torque being transmitted by the clutch. The control unit is arranged to routinely ascertain the reference position of the clutch, to routinely memorize and to thus actualize information pertaining to the ascertained reference position, to determine operational parameters which initiate shifts of reference position of the clutch, and to conform the reference position and the memorized information to the shifted reference position when the determined operational parameter exceeds a predetermined threshold value.

The output shaft of the clutch can constitute the input shaft of a change-speed transmission in the power train of the motor vehicle.

The aforementioned connection can comprise a hydraulic system between a mobile motor-operated member (such as a piston rod for the aforementioned piston)

and a clutch-operating member (such as a piston rod for the aforementioned lever) of the actuator.

The hydraulic system can further include a master cylinder which reciprocably receives the aforementioned piston and exhibits a snifting orifice adjacent a path for the piston. The aforementioned motor for the mobile member can be arranged to move the piston relative to the orifice; such motor can include or constitute a stepping motor.

The aforementioned sensor can include means for transmitting to the control unit signals denoting the position of the motor-operated member relative to the orifice.

The clutch can constitute a friction clutch, and the power train can further comprise an internal combustion engine having a rotary output member (such as a crankshaft) which is connected with the input shaft of the clutch.

The control unit can include at least one memory for signals from the monitoring devices, and such at least one memory can include means for storing regularly transmitted signals which are generated by the monitoring devices and signals generated by at least one of the monitoring devices under special circumstances of operation of the clutch.

The novel features which are considered as characteristic of the invention are set for in particular in the appended claims. The improved arrangement itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
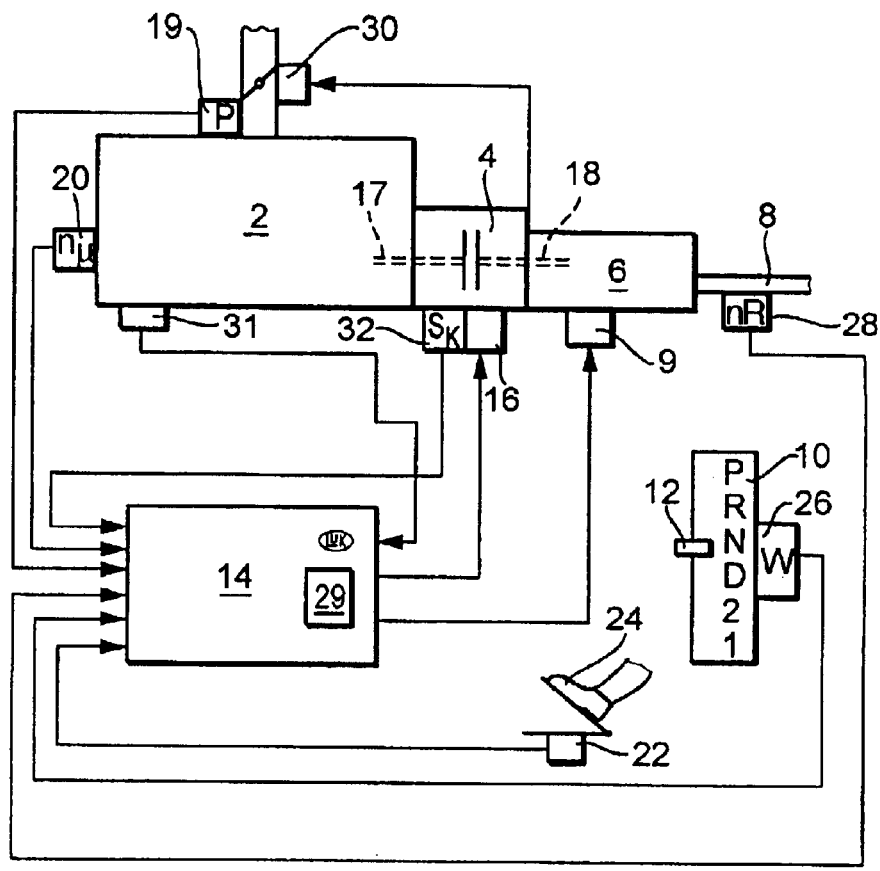
FIG. 1 is a schematic elevational view of a power train wherein a shift of reference position of a friction clutch is prevented or counteracted in accordance with the method of the present invention.

FIG. 1 illustrates certain relevant component parts of a power train in a motor vehicle wherein the power train employs an automated friction clutch 4 arranged to transmit torque between a prime mover 2 (such as an internal combustion engine) and a change-speed transmission or gearing 6. The output shaft 8 of the transmission 6 is arranged to transmit torque to the driven wheels (not shown) of the motor vehicle, e.g., by way of a customary differential. The transmission 6 can constitute a manually shiftable automated gearing. The reference character 9 denotes a transmission actuating device which can cause a gear selector 10 to shift the transmission 6 into a selected one of several gears including those denoted by the reference characters P, R, N, D, 2 and 1. The gear selector 10 includes a customary lever 12 which can be actuated by hand in a well known manner. The position of the lever 12 is monitored by a sensor 26 which transmits signals to the corresponding input of a control unit 14; the latter has several outputs one of which is connected to the transmission actuating device 9.

The clutch 4 can constitute a standard component having a clutch disc which operates between an input shaft 17 adapted to receive torque from the output shaft (such as a crankshaft) of the prime mover 2 and an output shaft 18. The latter can transmit torque to the input shaft of the transmission 6 or can include or constitute such input shaft. The means for actuating the clutch 4 includes an electric, hydraulic, hydroelectric or other suitable actuator (e.g., a novel and improved actuator 16 of the type shown in FIG. 2) which is connected to and can receive signals from the corresponding output of the control unit 14. The input shaft 17 can be rigidly connected to the crankshaft of the prime mover 2, and (if it is a separately produced part) the output shaft 18 can be rigidly connected with the input shaft of the transmission 6.

In addition to the sensor 26, the control unit 14 receives signals from a plurality of additional monitoring means including a sensor 19 which monitors the pressure in the suction pipe (not shown) of the prime mover 2, an RPM sensor 20 which ascertains the rotational speed of the crankshaft of the prime mover, a sensor 22 which ascertains the position (extent of depression) of a gas pedal 24, and an RPM sensor 28 which monitors the rotational speed of the output shaft 8 of the transmission 6.

The control unit 14 can comprise a standard microprocessor with associated memory or memories 29 for storage of characteristic fields or programs for the regulation of actuator means such as an actuator 30 serving to select the load upon the prime mover 2, the aforementioned actuator 16 for the clutch 4, the aforesaid actuating device 9 for the transmission 6 and, if necessary, one or more additional actuators which is or which are directly or indirectly connected with the corresponding output(s) of the control unit 14 and serve to operate additional consumers (not shown) which are directly or indirectly operated by the prime mover. The individual actuators can be constructed in such a way that their positions or settings are directly known in the control unit 14; alternatively, the power train can comprise additional or discrete position or condition indicators such as a position indicator 32 for the determination of a parameter which is relevant for the setting or position of the clutch 4.

The heretofore described constituents of the power train, as well as the manner in which they cooperate with each other, are known from the field of motor vehicles and, therefore, the exact details of their construction, interconnection and mode of operation will be described in detail only to the extent which is necessary for adequate comprehension of the present invention. It is to be understood that the illustrated power train is but one of numerous arrangements which can embody the present invention. By way of example only, the aforedescribed clutch 4 and/or the aforedescribed transmission 6 can be replaced with any one of numerous other types of clutches and/or transmissions without departing from the spirit of the present invention.

The memory 29 of the control unit 14 preferably stores a characteristic curve which establishes a desired or required setting of the clutch 4, as selected by the actuator 16, in dependency upon the magnitude of torque to be transmitted by the clutch. In order to enhance the quality of regulation, to reduce the extent of wear upon the clutch 4 and/or to reduce the energy consumption of the actuator 16, the transmittable clutch torque should not exceed the absolutely necessary minimum value. Such minimum value is dependent upon the desire of the operator of the motor vehicle (such as the operator-selected position of the gas pedal 24) as well as, for example, upon the load being ascertained by the sensor 31 for the prime mover 2 and, if desired or necessary, one or more additional parameters such as the signals from the sensor 20 denoting the RPM of the crankshaft of the prime mover 2.

The characteristic curve which is stored in the control unit 14 and which determines the desired position of an operating member 54 (here shown as a pivotable lever, see FIG. 2) of the actuator 16 as a function of the ascertained torque to be transmitted to the input shaft of the transmission 6, exerts the greatest influence upon the comfort of starting the motor vehicle as well as upon the ease of carrying out the gear shifting operatons. Such characteristic curve undergoes (a) short-lasting changes, for example, as a result of changes of temperature; and (b) long-lasting changes during the life of the clutch 4, e.g., as a result of wear. This is the reason that the characteristic curve is continuously actualized (adjusted or updated) in accordance with different strategies whenever the sensors of the power train ascertain the presence of predetermined operating conditions.

Figure 2:
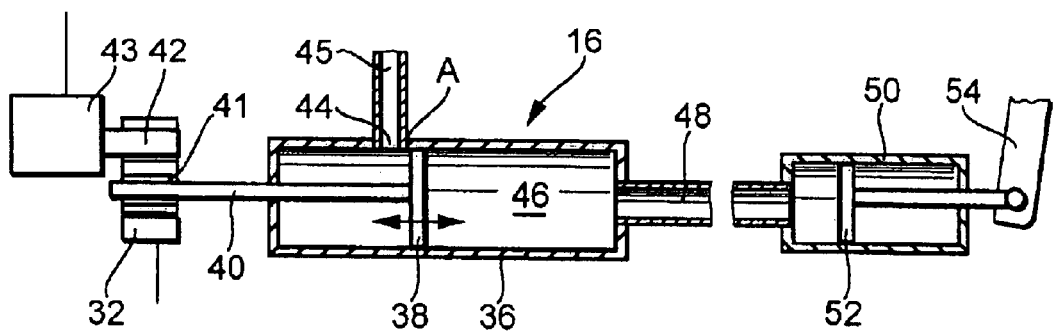
FIG. 2 is a diagrammatic partly elevational and partly sectional view of the arrangement which controls the actuator for the clutch in the power train of FIG. 1.

FIG. 2 illustrates the details of a presently preferred fuid-operated (hydraulic) actuator 16 for the clutch 4. This actuator comprises a liquid-filled master cylinder 36 containing a reciprocable piston 38 connected with a piston rod 40 which extends from the master cylinder and has external gear teeth mating with those of an internal gear 41. The latter further meshes with the external teeth of a driver pinion 42 on the output shaft of an electric motor 43. This motor is operated by signals being transmitted by the corresponding output of the control unit 14. For example, the electric motor 43 can be of the type adapted to be operated by PWM (pulse width modulation) signals. A presently preferred motor 43 is a stepping motor.

The master cylinder 36 is provided with a snifting or equalizing orifice 44 which is connected with a liquid storage vessel (not shown) by way of a hydraulic line or conduit 45. Reference may be had, for example, to FIG. 1B of commonly owned U.S. Pat. No. 5,632,706 granted May 27, 1997 to Kremmling et al. for "MOTOR VEHICLE WITH ELECTRONIC CLUTCH MANAGEMENT SYSTEM". The plenum chamber 46 of the master cylinder 36 is connected with the plenum chamber of a slave cylinder 50 by a hydraulic conduit 48, and the piston 52 of the slave cylinder is articulately connected to the aforesaid clutch disengaging lever 54, e.g., a lever which can act upon the customary diaphragm spring of the clutch 4 by way of a release bearing or the like. A friction clutch which can be operated by a release bearing or an equivalent clutch engaging/disengaging arrangement is disclosed, for example, in commonly owned U.S. Pat. No. 5,409,091 granted Apr. 25, 1995 to Reik et al. for "AUTOMATICALLY ADJUSTABLE FRICTION CLUTCH".

The location A, which is known as the snifting location, determines that position of the piston 38 which the latter assumes on its way toward pressurizing of hydraulic fluid in the plenum chamber 46 of the master cylinder 36. At such time, the chamber 46 is sealed from the adjacent end of the conduit 45 and from the liquid-containing vessel which is in communication with the other end of this conduit. The pressure of fluid in the plenum chamber 46 is communicated to that in the slave cylinder 50 and causes the piston 52 to change the position of the clutch operating member or lever 54.

The aforementioned sensor 32 (shown in FIGS. 1 and 2) is an incremental position indicator which serves to furnish signals denoting the axial position of that component of the actuator 16 that includes the piston rod 40 and piston 38 of the slave cylinder 36. The sensor 32 can monitor the axial position of the internal gear 41 which, as already explained hereinbefore, can mate with external teeth of the exposed end of the piston rod 40. The exact construction of the sensor 32 forms no part of the present invention; it suffices to say that this sensor monitors the axial positions of the parts 38, 40 and thus indicates the position of the piston 38 relative to the location A and the snifting or equalizing orifice 44. The indicator 32 can be arranged to count the number of gear teeth on the piston rod 40, while the latter moves relative to the slave cylinder 36, and to thus ascertain the distance which is covered by the piston 38 relative to the slave cylinder. Signals or impulses which are generated by the indicator or sensor 32 are transmitted to the corresponding input of the control unit 14. The number of such impulses can be a direct indication of the extent of axial displacement of the piston 38 in the slave cylinder 36 of FIG. 2. Furthermore, and if the piston 38 is located to the right of the location or position A shown in FIG. 2, the characteristics of signals from the sensor or indicator 32 are directly proportional to (i.e., indicative of) the angular position of the clutch operating lever 54 and hence of the extent of engagement of the clutch 4.

The piston 38 of the slave cylinder 36 is or can be combined or associated or made integral with a check valve (not shown in FIGS. 1 and 2) which opens when the pressure of hydraulic fluid in the left-hand portion of the slave cylinder (i.e., at the left-hand side of the piston 38, as viewed in FIG. 2) rises to a predetermined value. This causes the piston 38 to advance in a direction to the left and beyond the snifting position A. Consequently, the fluid-containing space between the pistons 38, 52 is free to communicate with the conduit 45 and the fluid in such space is not pressurized. This enables the lever 54 to assume a position in which the clutch 4 is fully engaged.

If the control unit 14 thereupon transmits to the motor 43 a signal which causes the latter to initiate a rightward movement of the piston rod 40, the fluid in the slave cylinder 50 causes the respective piston 52 to pivot the lever 54 as soon as the piston 38 advances to the position A. Such position of the piston 38 can be ascertained, for example, in that the energy consumption of the motor 43 increases. That one (A) of its positions in which the piston 38 overlies the snifting orifice at A is memorized in the control unit 14 (at 29) by memorizing the number of gear teeth which are counted at 32 and such position of this sensor corresponds to the engaged or operative condition of the clutch 4.

In addition to knowing the engaged or closed condition or position of the clutch 4, it is also necessary to ascertain at least one other position or condition of the clutch, e.g., that condition in which the clutch transmits or is set to transmit a torque of 4 Nm. Knowledge of the fully engaged condition of the clutch 4 is necessary because it plays an important role during starting of the motor vehicle as well as during shifting of the transmission 6 into different gears. The input and output shafts 17, 18 of the clutch 4 are fully separated from each other only when the clutch is disengaged or opened beyond the position of engagement. Furthermore, a comfortable shifting of the transmission 6 into a different gear or a shifting without endangering the transmission is possible only if the aforementioned prerequisites are fully met. Moreover, the motor vehicle exhibits a pronounced creeping action if the clutch is not fully disengaged for starting and/or for shifting of the transmission into a different gear.

The condition of engagement of a clutch is normally selected in that, in certain conditions of the power train (for example, when the motor vehicle is at a standstill, the operator applies the brake and the transmission is in gear), the clutch is fully disengaged and is thereupon slowly engaged while one measures the engine torque. When, during gradual engagement of the clutch, the engine torque (which, for one, is given with engine idling regulation by the position of an adjusting member for the idling regulation) reaches a predetermined value, the information furnished by the incremental position indicating (distance monitoring) sensor 32 is ascertained and the corresponding information is memorized as the engagement position or condition of the clutch. This renders it possible to rapidly reach such condition of engagement and to utilize it as an orientation value for the carrying out of the starting or for a shifting into different gears. An adaptation or actualization of the condition of engagement takes up about 5 seconds and is normally carried out at least once during each drive of the motor vehicle.

Individual points of the distance-torque curve of the clutch 4 which curve is memorized in the control unit 14 can be actualized in a similar fashion in that one ascertains the clutch torque and the corresponding position of the position indicating sensor 32 is read and memorized as an actualized new position. The torque being transmitted by the clutch 4 while the latter is still operated with slip is ascertained by determining the torque of the prime mover 2 by taking into consideration the change of its RPM and the moment of inertia. In this manner, the characteristic curve of the clutch, which furnishes the transmittable torque in dependency upon the position of the clutch actuating lever 54 of the actuator 16, can be ascertained in a point-by-point fashion. An adaptation of the characteristic curve of the clutch is required due to changes of friction value.

The scanning and engagement positions of the clutch 4 and/or of the clutch actuating lever 54, which are indicative of the torque being transmitted by the clutch as a function of the position of the lever 54, are of maximum importance for a rapid, proper and comfortable actuation of the clutch. In order to ensure that such positions can be determined independently of the changes of the hydraulic path in 46 and 48, it would be necessary to carry out routinely a series of snifting operations so that the snifting positions and the corresponding readings of the counter could furnish a reliable reference value.

A problem concerning the actual and accurate monitoring of information pertaining to the closed position, position of engagement and the positions of transmission of a predetermined torque is attributable to the following: The position of the lever 54 when the clutch 4 is fully engaged is the same as the snifting position of the piston 38 which latter can be read directly into the control unit 14 by way of the sensor 32. This basic reference position of the clutch 4 is continuously actualized (updated), for example, each 60 seconds while the clutch is fully engaged and, therefore, is actually available in a continuous manner. Any changes of the geometry of the hydraulic path which is established by the parts 46, 48 (e.g., due to temperature changes) are thus compensated for, the same as eventual leakages of the hydraulic system.

Actual changes of the clutch 4 itself, such as those attributable to wear, are relatively slow to develop so that an adaption of the condition of engagement or of those positions of the clutch actuating lever 54 (namely the characteristic curve of the clutch) which correspond to predetermined or selected torques being transmitted by the clutch are necessary at infrequent intervals.

If the transmission 6 is to transmit pronounced torque, its input shaft (such as the output shaft 18 of the clutch 4) is likely to move axially owing to the obliqueness of teeth of helical gears which are connected therewith (the extent of such axial displacement can be in the range of one or more millimeters). This causes an axial shifting of the clutch disc between the shafts 17, 18 and entails a shifting of the partial and full engagement positions of the clutch 4 and of the therein oriented characteristic curve of the clutch. This, in turn, results in discomfort to the occupant(s) of the motor vehicle during starting as well as during shifting of the transmission 6 into a different gear because the actuation of the clutch takes place with reference positions which were actualized and memorized while the input shaft of the transmission was called upon to transmit a high torque and such high torque no longer exists.

As already stated hereinbefore, an important object of the present invention is to overcome the just discussed problems which arise in conventional power trains.

In accordance with a feature of the invention, the afore-discussed problems are overcome by a method which renders it possible to avoid those shifts of reference positions which are caused by axial displacements between the input shaft and the output shaft of a clutch which is installed in the power train of a motor vehicle and is operated by an actuator. In accordance with the novel method, the reference position is ascertained in routine fashion and the results of such ascertainment are memorized (stored) and thus actualized. An operational parameter which leads to an axial shifting of the input and output shafts of the clutch is ascertained and the routine ascertainment and memorizing of the reference position are altered when the operational parameter exceeds a predetermined threshold value.

For example, a routine ascertainment can be fully dispensed with when the operational parameter exceeds the predetermined threshold value, or it can be considered in a manner different than when the operational parameter is below the predetermined threshold value.

It is of advantage if, when the threshold value is exceeded, the previously actualized reference position remains memorized while the threshold value is being exceeded so that, when the threshold value drops below the predetermined value, the memorized reference value is again available. It is also of advantage if, while the threshold value is being exceeded, one ascertains and memorizes an emergency reference position and, when the threshold value is exceeded, the operation of the actuator is regulated as a function of such emergency reference position.

The novel method can be practiced in connection with all clutches wherein axial shifting between the input and output shafts of the clutch takes place in dependency upon at least one operational parameter, namely or such as an axial shifting which entails a shifting of reference positions.

The method can be resorted to with advantage when the output shaft of the clutch constitutes the input shaft of the transmission in the power train of the motor vehicle (wherein the clutch is located immediately ahead of the transmission, as seen in the direction of transmission of torque from the prime mover to the wheels) and the operational parameter is the torque which is being transmitted by the input shaft of the transmission. In the embodiment of FIG. 1, torque which is being transmitted by the input shaft of the transmission 6 corresponds to that which is being transmitted by the prime mover 2 provided, of course, that the clutch 4 is fully engaged.

Furthermore, the novel method is preferably resorted to when the clutch 4 and the actuator 16 are connected to each other by a hydraulic arrangement (46, 48) and the reference position (such as that corresponding to the fully engaged condition of the clutch) is ascertained by resorting to a snifting operation (at A).

In accordance with a further presently preferred embodiment, the improved method is carried out in such a way that, if the torque acting upon the input shaft of the transmission is below a predetermined threshold value, a shifting operation is carried out at predetermined intervals, for example, every 60 seconds or, when the transmission is in neutral and the clutch is engaged, every 180 seconds. Such snifting operation is performed in order to ascertain and actualize the normal closed or engaged condition of the clutch 4. If the torque is above the predetermined threshold value, at least one emergency snifting operation is carried out in order to ascertain the emergency engaged condition of the clutch, and the actuator 16 is operated in accordance therewith while the torque is above the threshold value.

It is of additional advantage if the actual engagement condition of the clutch is set to match the condition prior to exceeding the threshold value if the torque decreases below the predetermined threshold value.

Still further, it is preferred to memorize at least one torque (and the corresponding position) which can be transmitted by the clutch when the torque being transmitted by the clutch is below the predetermined value and to reactivate when the torque drops below the predetermined value.

The illustrated arrangement for avoiding or preventing, as a result of axial shifting between the input and output shafts of a clutch, shifts of reference positions of a clutch 4 which is operated by an actuator 16 comprises a hydraulic device 46, 48 between the piston 38 and the lever 54, the control unit 14 for the actuator 16, sensors (19, 20, etc.) which are operatively connected with the control unit 14 and include at least one distance monitoring sensor (such as 32) which ascertains the position of the member 54 of the actuator 16, an arrangement for ascertaining the force being applied by the clutch actuator 16 to move the member 54, and an arrangement for ascertaining the torque being transmitted by the clutch 4. The control unit 14 is designed to carry out at least one of the aforediscussed embodiments of the improved method.

The following is an example of practicing the improved method by resorting to the improved apparatus. This example will be described with reference to the flow chart or flow diagram of FIG. 3 wherein the step 100 includes ascertaining whether or not the torque being applied to the output shaft 18 of the clutch 4 (i.e., to the input shaft of the transmission) is below a threshold value GW. If the torque being applied to the output shaft 18 is below the threshold value GW, the step 102 includes an actualization of the snifting position (closing position) SP in that the arrangement which is shown in FIG. 2 or an equivalent thereof performs a snifting operation and that position of the piston 38 which the latter assumes during movement past the snifting orifice 44 is memorized as a count furnished to the control unit 14 by the sensor 32. A snifting operation renders it possible to ensure that the snifting position actually corresponds to that position of the actuating arrangement 38, 40 which is indicative of the fully engaged position or condition of the clutch 4. This, in turn, ensures that the snifting operation does not alter that setting of the counter which corresponds to the fully engaged condition of the clutch 4.

Figure 3:
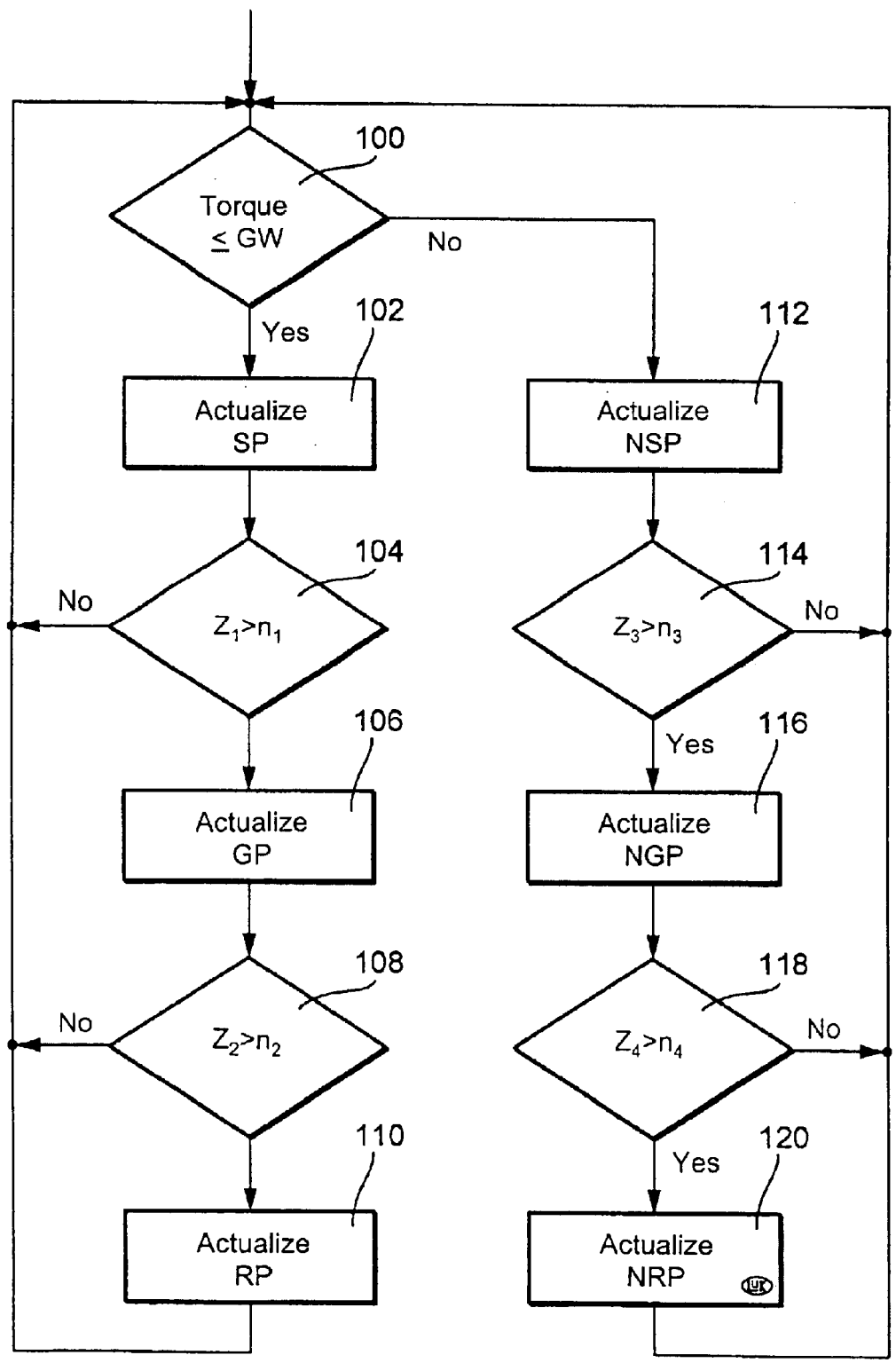
FIG. 3 is a flow chart of the steps of the novel method of preventing or counteracting a shift of reference position of the clutch in the power train of FIG. 1.

The step 104 of FIG. 3 is carried out in order to ascertain whether or not the information furnished by a counter $Z_1$ of snifting operations (this information exceeds by one that which was obtained during the preceding actualization of the closing position) exceeds a predetermined value $n_1$. If such is not the case, the system reverts back to the step 100. If the value $n_1$ is exceeded, i.e., if a snifting operation was carried out $n_1$ times, the next step 106 is carried out to actualize and memorize the position of engagement (GP) in the aforedescribed manner.

The next step 108 involves a determination whether or not a counter $Z_2$ (the setting of which is raised by one after each actualization) has reached the setting $n_2$. If such is not the case, the system reverts to the step 100. However, if such is the case, the next step 110 involves an actualization of a position RP of the clutch 4; such position corresponds to the transmission of the then applied torque and is characteristic of the actual friction value of the clutch. The system reverts back to the step 100. In this manner, the control unit 14 memorizes actual counter readings, namely those which correspond to the reference position of the clutch 4 and are thus ready to be utilized. It will be appreciated that the snifting (i.e., the actualizing of the engaged position as well as the actualization of the gripping position and friction value) can be carried out in a different, logical, pulse sequence so that the durations of pulses and the counter stands or the counter switchings can be selected accordingly.

If the carrying out of the step 100 results in a determination that the torque is above the threshold value GW, the step 112 is carried out to perform an emergency snifting operation (NSP) which involves conforming the hydraulic path to an altered clutch engaging position of the lever 54. The steps 114, 116, 118 and 120 are thereafter carried out in correspondence with the respective steps 104, 106, 108, 110 but the counter readings, timing intervals and switchings, etc. can be different. The memory or memories 29 of the control unit 14 can be different. In this manner, the memory or memories 29 of the control unit memorizes or memorize an actual emergency engagement position (NGP) and an emergency friction value (NRP) of clutch 4, namely a value corresponding to that operation of the clutch when the input shaft of the transmission 6 transmits high torque.

If the torque at 100 drops below the predetermined threshold value GW, the apparatus immediately carries out a snifting operation and proceeds with the last actualized values GP and RP.

It will be seen that the improved method involves a change of the normally progressing actualization routine whenever the engine torque GW is exceeded.

However, and in order to correct, during a long trip of the motor vehicle at an elevated load, the expansion effects of the hydraulic path, the apparatus carries out emergency snifting operations at intervals which, for example, are much longer than the intervals of normal cyclical snifting. Those emergency positions which are ascertained during the steps 116 and 120 can remain memorized so that they are immediately preferentially available at elevated torques following an emergency snifting operation.

The actualizations can progress in their entirety or with limitations.

To summarize:

(a) the actual friction value of the clutch 4 is memorized;

(b) the long-range snifting point is no longer adapted;

(c) the friction value adaptation as well as the adaptation of the short-lasting and medium-length scanning point continue to proceed; and (d) as soon as a snifting operation takes place below the threshold value GW, the actual friction value is set and the adaptions of the long-range scanning point are again permissible.

If the torque of the power train drops below the threshold value GW, a snifting operation is carried out as long as the conditions which are required therefor (the clutch must be fully engaged) exist. The next operation involves the customary snifting cycle with additional actualizations.

Referring again to FIG. 3, the term GW is intended to denote that threshold value of the extent of engagement of the clutch 4 (between its fully engaged and fully disengaged positions or conditions) at which the friction linings of the clutch disc come in contact with the pressure plate and/or with the counterpressure plate of the clutch so that the clutch begins to transmit torque. The term SP denotes that position or condition of the clutch in which the latter transmits torque without slip. The term "reference position" (RP) denotes that specific position or condition which the clutch assumes when it is calibrated, preferably when the clutch is fully disengaged.

The disclosures of the patents which are identified in this specification are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of operating friction clutches in the power trains of motor vehicles and, therefore, such adaptations should and are intended to be comprehended within the meaning and range of equivalence of the appended claims.

What is claimed is:

1. A method of ascertaining and regulating shifts of reference position of an actuator-operated clutch in the power train of a motor vehicle wherein the shifts are caused by axial displacements of at least one of the input and output shafts of the clutch relative to the other shaft, comprising:

a first step of routinely ascertaining the reference position of the clutch;

a second step of routinely memorizing and thus actualizing information pertaining to the ascertained reference position;

a third step of determining operational parameters which initiate shifts of reference position of the clutch;

a fourth step of conforming said first and second steps to the shifted reference position when the determined operational parameter exceeds a predetermined threshold value; and a fifth step of continuing to memorize and actualize, in the course of and subsequent to said fourth step, that information which is obtained in said second step.

2. The method of claim 1, further comprising the steps of ascertaining and memorizing an emergency reference position while the determined operational parameter is in the process of exceeding the predetermined threshold value, and regulating the actuator for the clutch as a function of the emergency reference position.

3. A method of ascertaining and regulating shifts of reference position of an actuator-operated clutch in the power train of a motor vehicle wherein the shifts are caused by axial displacements of at least one of the input and output shafts of the clutch relative to the other shaft, comprising:

a first step of routinely ascertaining the reference position of the clutch;

a second step of routinely memorizing and thus actualizing information pertaining to the ascertained reference position;

a third step of determining operational parameters which initiate shifts of reference position of the clutch;

a fourth step of conforming said first and second steps to the shifted reference position when the determined operational parameter exceeds a predetermined threshold value; and a fifth step of ascertaining and regulating shifts of reference position of an actuator-operated clutch in the power train of a motor vehicle in which the output shaft of the clutch is the torque-transmitting input shaft of a change-speed transmission, wherein said third step includes determining the torque which is being transmitted by the output shaft of the clutch.

4. A method of ascertaining and regulating shifts of reference position of an actuator-operated clutch in the power train of a motor vehicle wherein the shifts are caused by axial displacements of at least one of the input and output shafts of the clutch relative to the other shaft, comprising:

a first step of routinely ascertaining the reference position of the clutch;

a second step of routinely memorizing and thus actualizing information pertaining to the ascertained reference position;

a third step of determining operational parameters which initiate shifts of reference position of the clutch;

a fourth step of conforming said first and second steps to the shifted reference position when the determined operational parameter exceeds a predetermined threshold value; and a fifth step of establishing a hydraulic force transmitting path between the actuator and the clutch;

wherein said first step includes a snifting operation.

5. The method of claim 4, wherein said first and second steps are carried out at regular intervals as long as the operational parameter is below said predetermined threshold value, and further comprising the step of carrying out at least one emergency snifting operation to thus ascertain an emergency engagement condition of the clutch when the operational parameter exceeds said predetermined threshold value.

6. The method of claim 5, wherein said third step includes determining the torque being transmitted by the output shaft of the clutch and further comprising the steps of (a) ascertaining and memorizing an emergency reference position while the determined operational parameter is in the process of exceeding said predetermined threshold value and (b) setting the engagement stage of the clutch to coincide with the memorized emergency reference position when the torque decreases below the predetermined threshold value.

7. The method of claim 6, further comprising the steps of memorizing at least one torque being transmitted by the output shaft of the clutch while the determined operational parameter is below the predetermined threshold value, and reactivating the memorized at least one torque upon renewed drop of the torque below the predetermined threshold value.

8. An arrangement for regulating the shift of a reference position of an actuator-operated torque-transmitting clutch in the power train of a motor vehicle wherein the shift is caused by axial movements of at least one of an input shaft of the clutch and an output shaft of the clutch relative to the other thereof, comprising:
- a connection between a mobile multiple-position force-transmitting operating member of the actuator and a displaceable clutch setting member;
- a control unit for the actuator;
- a plurality of signal-transmitting monitoring devices operatively connected with said control unit and including a sensor arranged to transmit to the control unit signals denoting the positions of said operating member;
- means for ascertaining the force being transmitted by said operating member to displace said setting member; and
- means for monitoring the torque being transmitted by said clutch, said control unit being arranged to routinely ascertain the reference position of said clutch, to routinely memorize and to thus actualize information pertaining to the ascertained reference position, to determine operational parameters which initiate shifts of reference position of the clutch, and to conform the reference position and the memorized information to the shifted reference position when the determined operational parameter exceeds a predetermined threshold value.

9. The arrangement of claim 8, wherein the output shaft of said clutch is the input shaft of a change-speed transmission in the power train.

10. The arrangement of claim 8, wherein said connection comprises a hydraulic system between a mobile motor-operated member and a clutch-operating member of the actuator.

11. The arrangement of claim 10, wherein said mobile motor-operated member includes a reciprocable piston and said clutch-operating member includes a pivotable member.

12. The arrangement of claim 11, wherein said hydraulic system further includes a master cylinder reciprocably receiving said piston and having a snifting orifice adjacent a path for said piston.

13. The arrangement of claim 12, wherein said motor is operable to move said piston relative to said orifice.

14. The arrangement of claim 13, wherein said motor includes a stepping motor.

15. The arrangement of claim 14, wherein said sensor includes means for transmitting to said control unit signals denoting the position of said motor-operated member relative to said orifice.

16. The arrangement of claim 8, wherein said clutch is a friction clutch and said power train further comprises an internal combustion engine having a rotary output member connected with said input shaft.

17. The arrangement of claim 8, wherein said control unit includes at least one memory for signals from said monitoring devices.

18. The arrangement of claim 17, wherein said at least one memory includes means for storing regularly transmitted signals generated by said monitoring devices and signals generated by at least one of said monitoring devices under special circumstances of operation of said clutch.

* * * * *